United States Patent [19]

Donohoo

[11] Patent Number: 4,891,785

[45] Date of Patent: Jan. 2, 1990

[54] METHOD FOR TRANSFERRING DATA FILES BETWEEN COMPUTERS IN A NETWORK RESPONSE TO GENERALIZED APPLICATION PROGRAM INSTRUCTIONS

[76] Inventor: Theodore J. Donohoo, 1027 Evergreen Trail, Lino Lakes, Minn. 55014

[21] Appl. No.: 216,770

[22] Filed: Jul. 8, 1988

[51] Int. Cl.[4] .................................................. G06F 9/00
[52] U.S. Cl. ............................... 364/900; 364/942.03; 364/940.81
[58] Field of Search ................................ 364/200, 900

[56] References Cited

U.S. PATENT DOCUMENTS

| | | | |
|---|---|---|---|
| 4,011,545 | 3/1977 | Nadir | 364/200 |
| 4,228,496 | 10/1980 | Katzman et al. | 364/200 |
| 4,256,926 | 3/1981 | Pitroda et al. | 364/200 |
| 4,402,045 | 8/1983 | Krol | 364/200 |
| 4,527,237 | 7/1985 | Frieder et al. | 364/200 |
| 4,620,276 | 10/1986 | Daniell et al. | 364/200 |

Primary Examiner—Thomas M. Heckler
Assistant Examiner—John G. Mills
Attorney, Agent, or Firm—Paul L. Sjoquist

[57] ABSTRACT

A method for transferring data files between processors in a linked network of computer processors, under applications program control operable in one or more of the processors, wherein a special applications program instruction is devised to cause the executing computer to process a utility program which identifies the data file being requested and transmits a request for such data file to another computer processor holding the data file. The computer processor holding the data file implements a special utility routine in response thereto, to first identify whether the requesting computer processor is authorized to receive the data file, and then transmits the data file to the requesting computer processor.

2 Claims, 7 Drawing Sheets

METHOD FOR TRANSFERRING DATA FILES BETWEEN COMPUTERS IN A NETWORK RESPONSE TO GENERALIZED APPLICATION PROGRAM INSTRUCTIONS

FIELD OF THE INVENTION

The present invention relates to a method for tranferring data files between computer processors; more specifically, it relates to a process for enabling an application program in a first computer processor to access the data files in a remote computer processor as though those remote files were domiciled in the same computer processor as the requesting application program.

BACKGROUND OF THE INVENTION

In the art of computer processing systems the universe of computer software can be thought of as existing in three tiers: operating software systems, which manage the computer hardware resources; application programs, which are referred to herein as "consumer programs," which perform the "useful" work required from the computer processing system; and utility programs, which move relevant data to a predetermined storage area for access by the application programs in a usable fashion. In general, the operating software system for a particular computer processor is uniquely written to accommodate the particular hardware design characteristics of that computer system. Likewise, utility programs are written to accommodate particular computer hardware designs, and to facilitate connection of the computer to other external devices, usually devices for storing or displaying data, or for receiving or transmitting data. Application programs, on the other hand, are typically written in a more general format in order to be operable on different computer processing systems, and such programs tend to be task-oriented programs, formatted to do work or to produce results which are useful in the work outside the computer processor.

The applications programs residing in a particular computer processing system might be thought of as residing within a "utility cushion" unique to the processing system, i.e., a set of programs internal to the computer system that control its internal data accessing operations during the execution of an application program. For example, an application program may require access to a volume of data stored in a particular memory device, and a utility program is therefore called upon to make the transfer of the data from the memory device to a storage region which is accessible by the application program. As a further example, an application program may require an output device to be activated as a part of the application process, and a utility program is called upon to activate the output device and make the necessary data transfer for the required application.

When a number of computer processors are interconnected with a view toward providing an interchange of data between the computer processors, certain hardware and software additions must be made to all such interconnected computer processing systems. The hardware connectivity involves providing the necessary data transmission paths for transmitting and receiving the data signals; a related software delivery program must also be provided in order to systematize and facilitate the use of the hardware connectivity features. This idea of interconnecting computer processors has become known as "networking," wherein data which is prestored within one computer processing system may be transferred, at various transfer rates, to a designated storage location within a second computer processing system. However, the essence of "network" is to make discrete copies of data from one computer processing system to another in the network.

In the field of "networking," recent attention has been given to transferring such data at very high data transfer rates. Network Systems Corporation, of Minneapolis, Minnesota, has developed specialized hardware connectivity features, designated by the trademark "HYPERchannel," which are controlled by a software delivery system designated by the trademark "NETEX." This networking arrangement enables the high-speed transfer of large amounts of data between computer processing systems of similar or dissimilar manufacture. However, this and other approaches to "networking" are strictly restricted to the transfer of data or blocks of data between computer processing systems under discrete operator control. The applications programs that reside in the various computer processing systems in the "network" are and remain isolated in their respective processors, and it is only the data which may be copied from one machine to another, usually as a result of an operator entering discrete commands into the computer via an operator's keyboard.

There is a need for applications programs within one computer processor to be able to access data from within another computer processor, as the need for such data becomes apparent during the execution of an applications program. That is, there is a need for an applications program to call out dynamically from within itself for data transfers to or from another computer as a part of the execution of the application program. One approach to meeting this need is by expanding the "utility cushion" in each interconnected computer processor in order to make it available to all interconnected computer processors in the network, which would have the result of permitting an applications program to interact with data without having a specific awareness of the computer processor in which the data resides. This leads to the logical result that the "networking" is placed under the control of the application programs, and effectively expands the "utility cushion" into a "networking cushion," i.e., a network of utility programs which are accessible by any of the computer processors in the network.

SUMMARY OF THE INVENTION

A method for interconnecting multiple computer processors and for interactive data transfer therebetween, for enabling applications programs operating in a first computer processor to access data files in a second computer processor, automatically and without operator intervention, and wherein the first processor application program does not require advance information as to the operational particulars of the second computer processor. To accomplish this purpose a unique application program instruction is devised which, when executed during the operation of the application program, causes the computer to execute a special utility program. The special utility program transmits code words to the second computer processor, identifying the transmitting computer programs and the desired data files. This causes the second computer processor to execute its special utility program, thereby causing the second computer processor which retains the requested data files to transmit same to the requesting computer processor. The utility programs of the second computer processor are thereby effectively brought under command and control of the first computer processor for data file transfer.

It is a principal object of the present invention to implement an interactive process between and amongst a number of interconnected computer processors, to cause such computer processors to interact and operate as though they were effectively a single computer processing system.

It is another object and feature of the present invention to provide a method for moving data within a network of computers independently of computer, network, data structure, or programming language.

It is a further object of the present invention to integrate the utility programs of different computer processors into a networking process, to provide accessibility to all utility programs by any of the computer processors in the network.

It is a further object and feature of the invention to isolate data and hardware dependencies into well-defined modules.

DESCRIPTION OF THE PREFERRED EMBODIMENT

Figure 1:
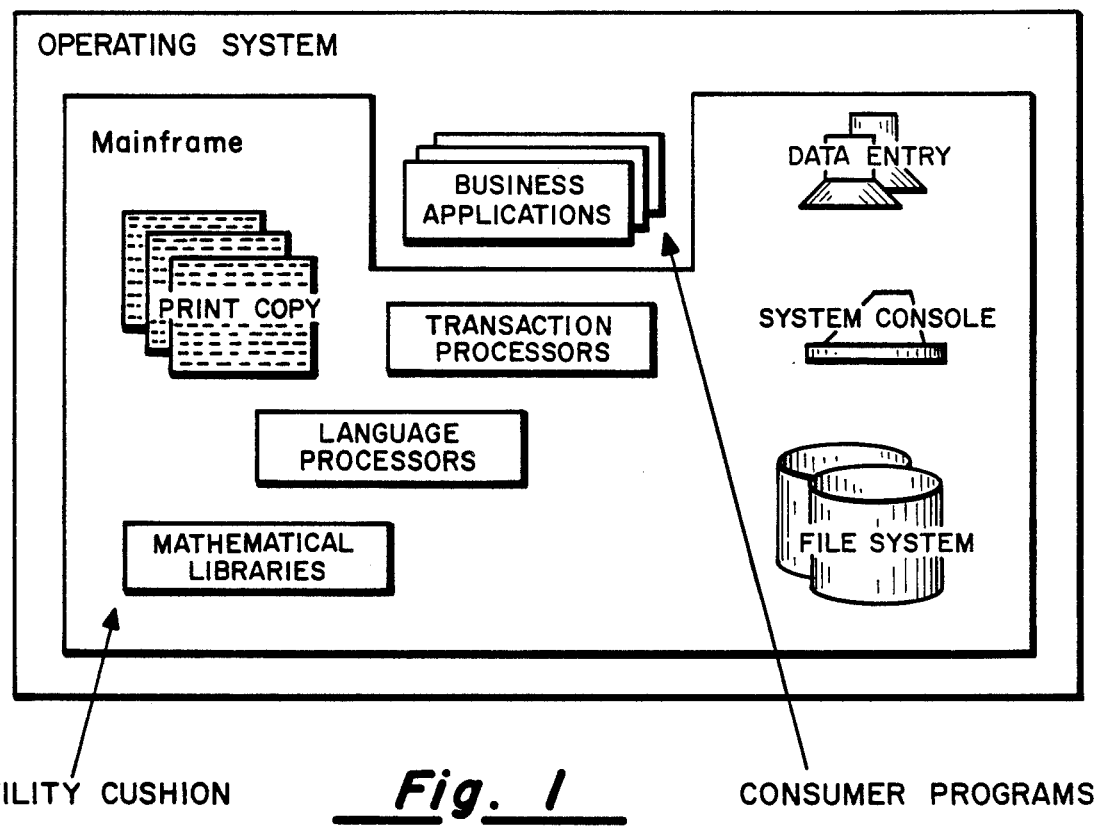
FIG. 1 shows diagrammatic representation of software.

A preferred embodiment of the present invention will be described with reference to the networking system commercially sold by Network Systems Corporation, although the principles of operation are equally applicable to other types and forms of interconnected multicomputer processors, connected together as a network. Network Systems Corporation, offers hardware connectivity known as "HYPERchannel," with interactive software known as "NETEX." The term "HYPERchannel" and the term "NETEX" is a trademark of Network Systems Corporation.

The NETEX software follows the International Standard Organization (ISO) family of network protocols, and operates on a principle somewhat analogous to ordinary telephone communications. That is, the code names, "phone numbers," of all computer processors in the network which are available for transmitting data files are "published" to all other computer processors in the network. In the event any computer processor in the network desires to obtain or send data files to other computer processors in the network it "dials" the published code word or "number." Once this connection is made and confirmed, the data file transfer may take place. In the NETEX software context, the analogy to "publishing" a phone number is accomplished by a particular computer processor executing an instruction called SOFFR, which in effect notifies all other computer processors in the network that it is available for interconnection and data file transfer. The telephone analogy to "dialing" the published number is accomplished by an instruction called SCONN, which is executed by a computer processor desiring to connect to another processor in the network, and the confirmation that the connection has been made is through an instruction signal called SCONF. The present invention is designed to conform with this general ISO interconnection procedure, and to be transparent to derivative protocol families, such as TCP-IP.

The present invention utilizes a pair of complementary software utilities to employ the delivery services of "HYPERchanneel" and "NETEX" for acquiring and returning data files. To implement the process, the computer processors, and the applications programs residing therein, in the networking system are conceptually organized into a series of "HUBS" and interconnected "RIMS." Each computer processor which is designated as a "HUB" is operable as a host processor for the data files which it stores and controls, and each computer processor which is designated as a "RIM" is operable as an application program processor having the capability of obtaining access to data files stored in a "HUB." A "HUB" may be thought of as the library of all data file information, and each "RIM" may be thought of as a requester having the capability of checking out data files from the "HUB," One "HUB" may service requests concurrently from any number of peripheral "RIMS."

In any actual networked system, which may comprise a number of computer processors interlinked with appropriate networking hardware and software, the concept of "HUBS" and "RIMS" may be applied in various capacities and mixes. For example, any single computer processor in a networked system may be designated a "HUB" for the data files which it stores and controls, but may also be designated a "RIM" in order to have access to other data files stored and controlled within other computer processors in the network. A network may comprise a number of "HUBS" and "RIMS," depending upon the location of data files and the desired accessibility to such data files.

Comparison with Prior Art

In accordance with an understanding of the present invention, it is helpful to view any computer processor as comprising three tiers of software, as illustrated in FIG. 1. A mainframe computer may have stored therein a number of utility programs, such as "PRINT COPY" programs, "DATA ENTRY" programs, "SYSTEM CONSOLE" programs, "FILE SYSTEM" programs, and various transaction and language processors and mathematical libraries. These utility programs essentially function to access the computer hardware resources for accomplishing specific internal operations on command from various applications programs. Applications programs are typically those programs which do "useful work" at the behest of an operator. The interaction between the application programs and the utility programs are controlled by operating system routines, which manage the interaction in the computer processor between the application programs and the utility programs, in a usable fashion. The representation of all of these software programs in FIG. 1 diagrammatically shows the utility programs as a "utility cushion" essentially surrounding all of the hardware devices, applications programs which are typically brought into the mainframe computer to accomplish "useful" work by way of business of other applications, and an operating system to enable interaction between the application or consumer programs and the utilities programs.

Figure 2:
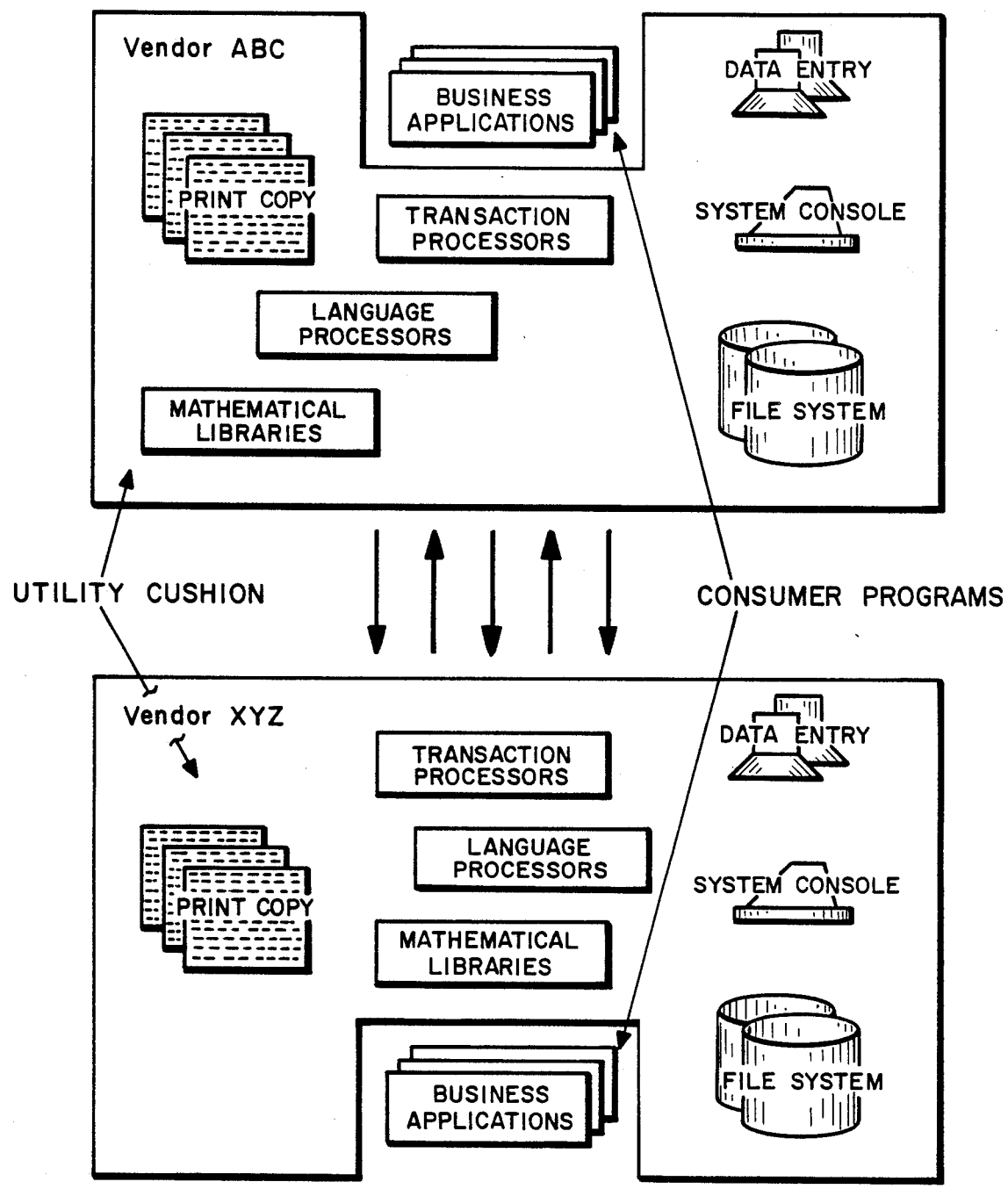
FIG. 2 shows a diagrammatic representation of processor interconnections.

In an networked system, two or more mainframe computer processors are interconnected to permit sharing of data files. The various computer processors are linked together by bi-directional hardware transmission paths as shown by the arrows in FIG. 2, to enable the data from one computer processor to be copied into the data storage area of another computer processor. Each of the processors has its own hierarchy of operating software, utilities and applications programs. If an applications program in one computer processor needs to utilize data files residing in another computer processor, operator intervention is usually required to activate the transfer. The operator typically initiates commands to actuate special utility programs in the first computer processor to transfer data files over the interconnecting link, usually at high transmission rates. The second computer processor, similarly under operator control, utilizes its utility cushion to set up and complete this high-speed data transfer. Each computer processor operates independently, being interlinked to another computer processor only for the purpose of interacting to transfer data from one place to another, as is diagrammatically shown in FIG. 2. The mainframe computer processors are respectively labeled "Vendor ABC," and "Vendor XYZ," to signify that mainframe computer processors in a networking situation need not necessarily be computers manufactured by the same manufacturer. In a typical operational environment, data files may be created within the mainframe designated "Vendor ABC," and these data files may be copied to the mainframe "Vendor XYZ," by using a hand-carrying method, such as transporting a magnetic tape reel from one mainframe to the other. Such copying may also be accomplished by telecommunication methods, or by a local area network such as "HYPERchannel," but in either case the system console operator and the respective operating software in both mainframes are involved to coordinate and complete the copy transfer.

Figure 3:
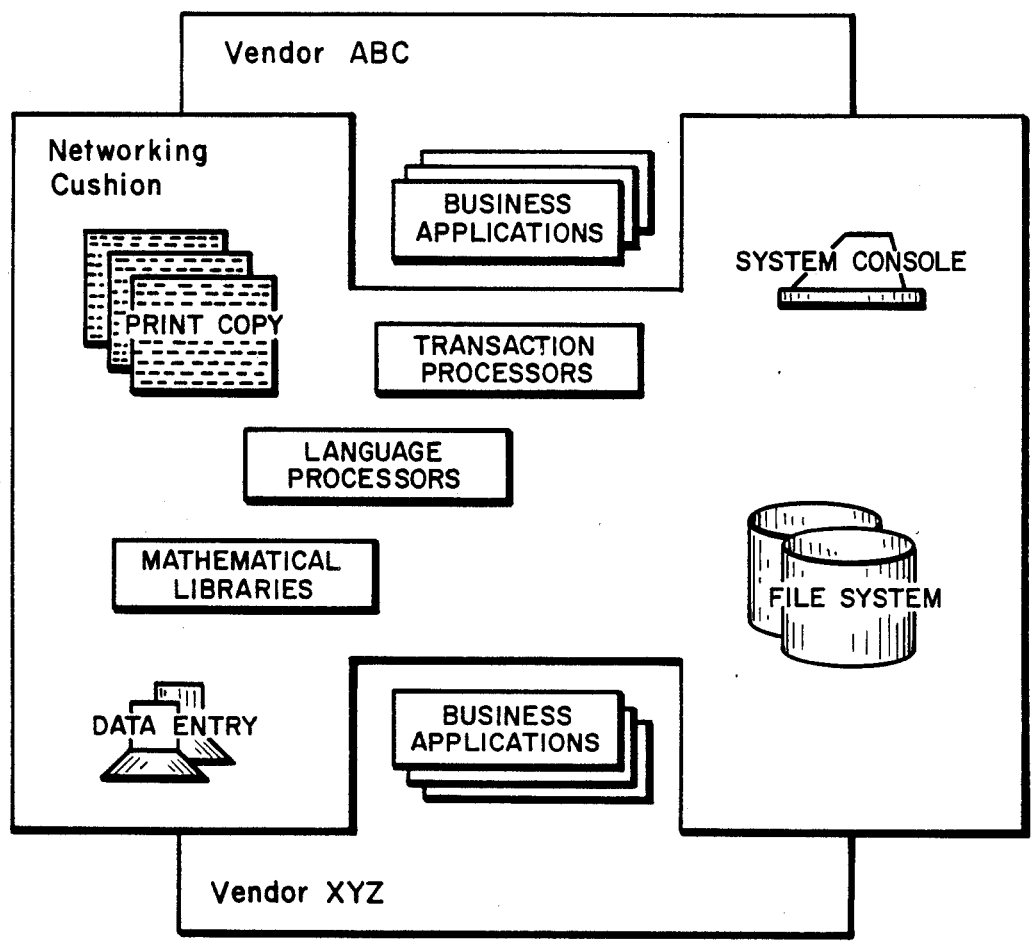
FIG. 3 shows a diagrammatic representation of the effect of the invention.

FIG. 3 diagrammatically illustrates the effect of implementing a networking system with the present invention; the respective computer processors still utilize their own internal operating software and utility cushion, and independently execute their application programs, but the present invention enables the applications programs of all interlinked computer processors to permit a sharing of data and software amongst the interlinked computer processors. The utility cushion and operating programs of all interlinked computers become transparent to one another, and an application program in one computer processor may access data files of another computer processor without having direct knowledge of the operational details of the domicile of the needed data files. Furthermore, the respective computer processors may be of different manufacture and the programmed according to different rules, and the various computer processors need have no direct awareness of these differences. A computer processor having need for a particular data file (i.e., a RIM) need only identify the data file it seeks and its own identity, and another computer processor (i.e., the HUB) will arrange for the retrieval of the data file and for transmission of the data file to the requesting computer processor RIM.

Figure 4:
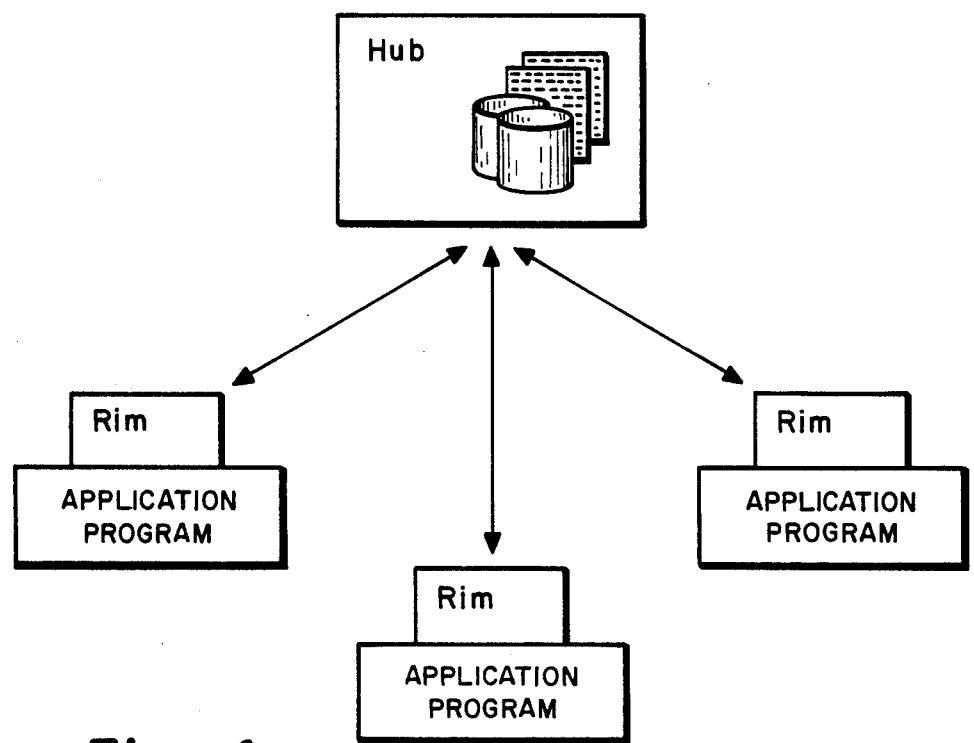
FIG. 4 diagrammatically shows the organization of computer processors.

The organization of computer processors according to the teaching of the present invention is diagrammatically illustrated in FIG. 4. In this diagram each of the RIMS and HUBS is located in an independently operated computer processor, interconnected as a networked system according to networking principles which are well known. In each of the RIM processors an application program may be executed, and the HUB computer processor may store data files which are periodically requested by one or more RIM systems.

As a first step in implementing the present invention, it is necessary to devise a unique application job-control instruction to call into execution the special utility programs which implement the method of the present invention. Since the computer processors manufactured by different vendors utilize different job-control instructions for their operation, there must be a unique new job-control instruction devised for each of the vendor systems. For example, the following table illustrates one job-control instruction, i.e., the file assignment instruction, for each of three different computer processors, together with the respective unique new file assignment instruction which has been devised for use with the invention. In each case, a file assignment instruction includes a "command" portion which designates that the operation is a file assignment, and an "operand" portion which designates which files is to be assigned. In the table below, the "operand" portion has been identified as "FILEONE."

| Computer Processor Type | Vendor Instruction | New Instruction |
| --- | --- | --- |
| UNISYS 0S1100 | @ASG FILEONE | @NETASG FILEONE |
| VAX VMS | DEFINE FILEONE | NETDEFINE FILEONE |
| IBM MVS | //FILEONE DD | //FILEONE NET DD |

In each of the foregoing example, the uniquely defined instruction is unrecognizable to the operating system software residing within the computer processor, but is recognizable to the special utilities program to be hereinafter described. In each case, execution of the uniquely-defined applications program instruction will be accomplished by the special utilities software, in conjunction with the normal computer processor operating system and utilities cushion; however, the applications program (and the applications programmer) will have no special understanding as to how the execution is accomplished. In writing such a special file assignment instruction, the applications programmer need only know that he is ordering a file assignment for a data file which is located somewhere within one of the plurality of computer processors connected on the network, without having any particular knowledge as to where the data file identified as "FILEONE" may be actually located.

Other examples of job-control instructions which may be uniquely devised for use in conjunction with the present invention are NETPRINT, NETFORTRAN, and NETSUBMIT. The special job-control instruction NETPRINT may be used to create a network printing command, to control the operation of a printer which may be physically located on a computer processor different from the computer processor which executes the application program calling for the print job. The special instruction NETFORTRAN may similarly be utilized by an applications program in one processor, to call a compiler which is domiciled in another processor in the network. The special instruction NETSUBMIT may be utilized as an applications program instruction in one processor to control the placement of a job, and its eventual execution, onto any computer processor which forms a part of the network. Other and further examples may be found, wherein the inventive techniques described herein may be applied to expand the capabilities of a computer network, to enable an applications program to automatically control operations throughout the network.

Figure 5:
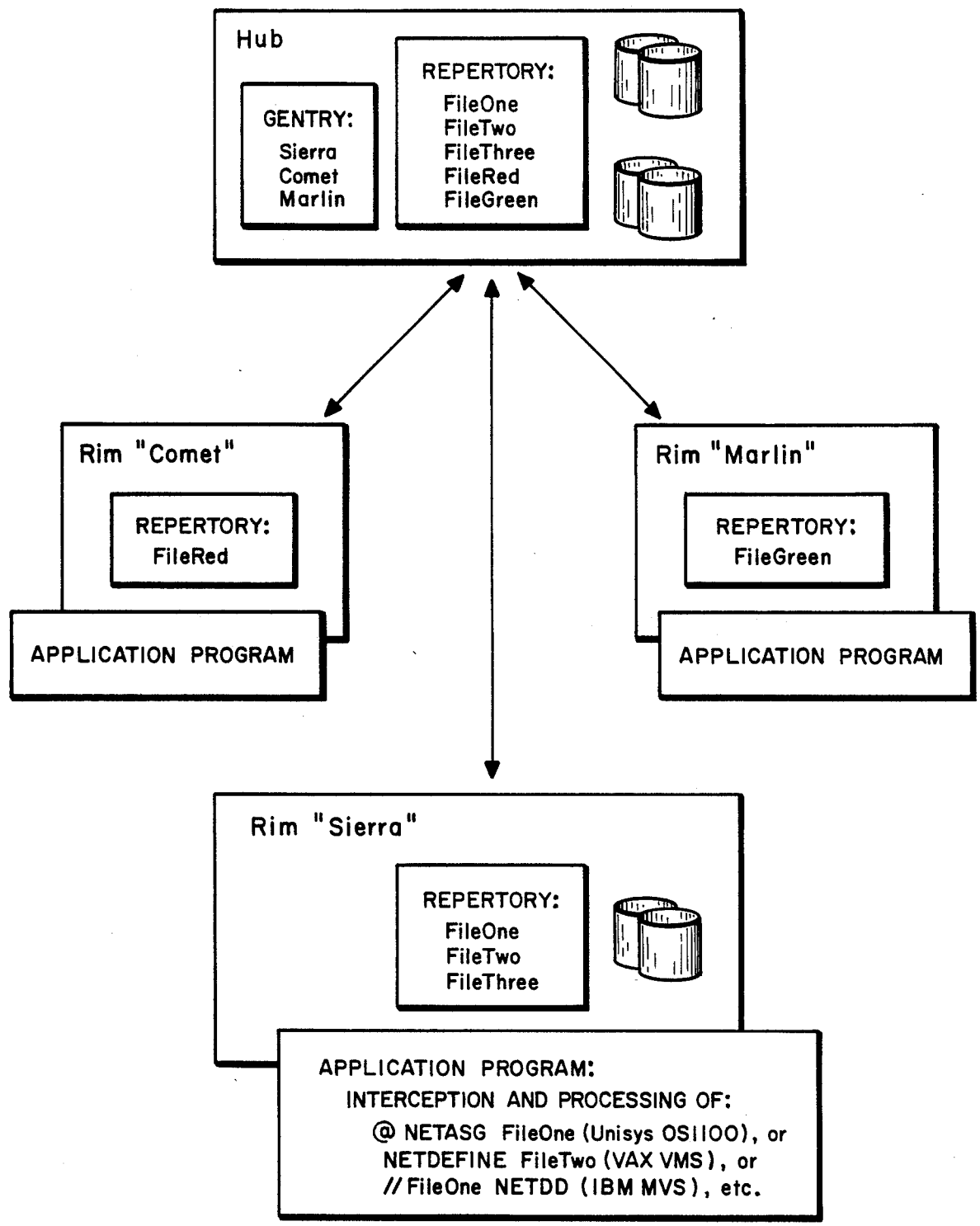
FIG. 5 illustrates interconnected systems according to the teachings of the invention.

FIG. 5 illustrates diagrammatically another important aspect of the present method. Each of the RIM application programs is designated by a unique name, and the HUB program maintains a file of all of the names of the RIM programs with which it is required and permitted to transfer data files. When any of the interconnected RIM programs seeks the transfer of a data file it first signals the HUB program with its unique name, and the HUB program makes reference to a "GENTRY" file wherein it has listed all authorized names of RIM programs to which it will provide a data file access.

A further aspect of the present invention which is diagrammatically illustrated in FIG. 5 is that each of the RIM programs maintains a "REPERTORY" file of the names of the data files to which it might seek access. For example, the RIM program identified as "SIERRA" maintains a repertory of three data file identifications: "FILEONE," "FILETWO," and "FILETHREE." This repertory of data files represents the entire list of data files to which the RIM program "SIERRA" may need to access, and further represents a restricted list of only those data files to which the RIM program "SIERRA" will be permitted to access. Likewise, the RIM program designated "MARLIN" has a repertory of only a single data file "FILEGREEN," which represents the only data file to which this RIM program may access. The RIM program having the name "COMET" also has a repertory of only a single data file "FILERED," which represents its data file accessing requirements. By contrast, the HUB program maintains a complete repertory of all data files which it stores and controls, which necessarily includes the names of all data files which might be accessible by any of the RIM programs connected to the HUB program.

As described above, the HUB program maintains a "GENTRY" listing of all of the authorized RIM programs to which it may be connected. When the HUB program receives a data file request from one of its connected RIM programs, the HUB program first receives the identifying name of the requesting RIM program, and examines its "GENTRY" list to determine whether the requesting RIM program is authorized to receive the data file transfer. If the HUB program determines that the requesting RIm program is authorized to receive the data file transfer, it then checks to see whether the particular data file being requested is one which may be transmitted to the requesting RIM program. If the HUB program determines that both the name of the RIM program is authorized, and the name of the requested file is authorized, it will then permit the connection for purposes of transmitting the requested data file to the requesting RIM program.

In the example shown in FIG. 5, the RIM program identified as "SIERRA" intercepts a unique file assignment instruction requesting the transfer of one of the repertory of data files "FILEONE," "FILETWO," or "FILETHREE." This RIM program then identifies itself to the HUB program as "SIERRA," and further indicates that it desires the transfer of one of the three data files which are identified in its repertory, the HUB program then checks the "GENTRY" list to determine that "SIERRA" is an authorized RIM program, and then checks the "REPERTORY" list to determine that the requested data file is authorized to be transferred, and finally, completes the transfer of the data file.

In operation on a UNISYS OS1100 mainframe, the method is practiced by the application programmer substituting a "@NETASG" file name for the usual "@ASG" file name. In making this substitution, the application programmer knowingly expands the available repositories for the desired data files to all HUB programs which are interconnected as a part of the networking system. The application programmer, writing an applications RIM program, need not known in which HUB program the desired data file is located, but merely knows that the desired data file is located at least one HUB program which is a part of the network. When this special instruction is executed by the RIM program for which the applications instruction was written, the special utility residing in that processor will intercept the instruction and automatically complete the necessary identification and authorization steps to permit the requested data file to become transferred to the requesting RIM program.

Similarly, when an applications programmer is writing a program for execution on the VAS VMS mainframe computer processor, the programmer substitutes the command "NETDEFINE" file name for the usual "DEFINE" file name instruction, and the special utility program residing in this processor will intercept the command and automatically make the necessary data file transfer, if identification and authorization rules permit the transfer to be made. Likewise, the applications programmer writing software for the IBM MVS mainframe computer makes a similar substitution, utilizing the special instruction adapted for the IBM system.

In the mainframe processor hosting a HUB program, it is necessary to incorporate the "GENTRY" list of information to identify to the HUB program which RIM programs may be connected to it and are authorized to receive data files from the HUB program. Likewise, the HUB program is prestored with a list of "REPERTORY" data file information to indicate which data files are authorized for transfer to RIM programs. Once this identifying information is entered into the HUB program, the processor hosting the HUB program may be programmed with application programs independent of its role as a HUB program host, in conjunction with the interconnected RIM programs.

Figures 6, 7:
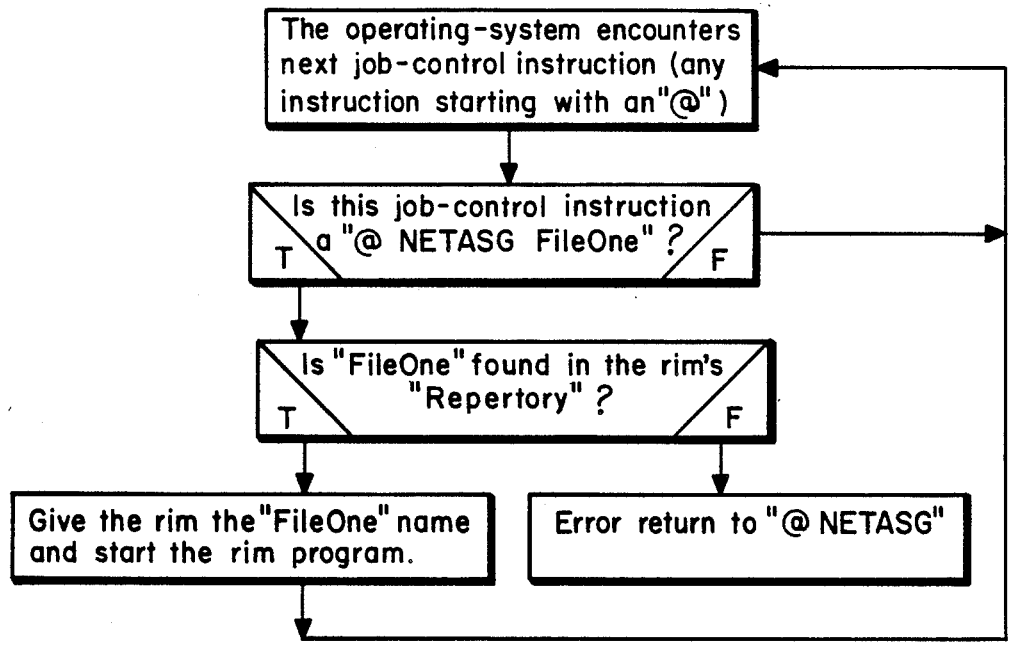
FIG. 6 shows a generalized flow chart.
FIG. 7 shows a further generalized flow chart.

FIG. 6 shows a generalized flow chart, illustrating the intercept routine for identifying when a special job-control instruction is executed by any RIM program. This intercept routine is activated whenever the computer processor operating system encounters a job-control instruction, such as the one illustrated in FIG. 6. The job-control instruction is examined to determine whether it is a special job-control instruction which has been created to obtain job-control access to the network. If the job-control instruction is determined to be one of the special job-control instructions, the "operand" portion is then examined to determine whether the data file is found in the "REPERTORY" associated with the applications program. If the data file is properly identified the file name is passed onto the special utility program, designated the "RIM PROGRAM." If any of the test conditions recited above are found not to exist, control is returned to the operating system, or to an error-producing flag, to end the interception routine.

FIG. 7 shows a generalized flow chart of the special utility programs which are operable in the "RIM" and the "HUB" processors, and in conjunction with the applications programs which may have executed one of the special job-control instructions. As a preliminary step, the HUB processor has extended SOFFERs to the community of RIM processors and applications program to which it is interconnected, following the usual convention of NETEX software. The RIM program is given control after the interception routine, previously described, has determined that a special job-control instruction needs processing with a valid data file request. The example of FIG. 7 corresponds to the example shown in FIG. 5, illustrating the several steps which are accomplished as a result of the interconnection scheme illustrated in FIG. 5.

Once the RIM program has been actuated, the RIM program issues a SCONN command, again following the NETEX software format, which is passed to the interconnected HUB processor, and also it identifies itself by a predetermined name, i.e. "SIERRA." The HUB processor receives the SCONN signal and the name of the requesting software (SIERRA), and confirms from its "GENTRY" file that the requesting software is authorized to receive the data files being requested. The HUB processor then executes the SCONF instruction, which confirms the connection between the processors. The SCONF signal is received by the RIM application program, and, in response thereto, it transmits the file name (FILEONE) to the HUB processor. The HUB processor reads the file name and examines its "REPERTORY" file to determine that the file name is authorized for transfer. Thereafter, the HUB processor either retrieves the designated file for transmission to the requesting application programs, or activates an appropriate internal utility program for implementing this transfer.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of transferring data files between computer processors linked together in a computer network, under application program control, comprising the steps of
    (a) designating one or more computer processors having data files stored therein as HUB processors;
    (b) designating one or more computer processors as RIM processors, each of said RIM processors having need for potential access to said data files;
    (c) assigning a unique identity to each of said RIM processors and said data files potentially accessible by said RIM processors;
    (d) tabulating the unique identities of all of said RIM processors and tabulating the unique identities of said data files in said HUB processor;
    (e) devising a plurality of special application program instructions for execution by any of said RIM processors, each of said special application program instructions having a portion containing a unique data file identity;
    (f) providing, in each of said RIM processors, means for decoding said plurality of special application program instructions, and for signaling said HUB processor with the identity of the RIM processor and the unique data file identity; and
    (g) providing, in said HUB processor, means for transferring data files to the RIM processor identified as a result of step (f).

2. A method of organizing a plurality of computer processors linked together in a computer network for associative data file transfers therebetween, wherein one or more computer processors, designated as one or more hub processors, contain uniquely identified data a files which may be accessed, and one or more computer processors, designated as rim processors, contain applications programs which may require access to said uniquely identified data files; and wherein each of said computer processors is operable under control of its own unique instruction set, including instructions for implementing data file transfers between computer processors, comprising the steps of
    (a) assigning a unique identity to each of said rim processors and tabulating within a repertory file in each said rim processor the respective unique identities of the data files to which it may require access;
    (b) tabulating within a repertory file in each said hub processor the unique identities of all of said data files which are contained within said hub processor, and tabulating within a gentry file in each said hub processor the respective unique identities of all of said rim processors which may be permitted to access respective data files in said hub processor;
    (c) assigning a unique universal identifier to selected ones of said instructions in each computer processor's respective unique instruction sets, said universal identifiers each designating the need for a data file transfer between a hub processor and rim processor, and selectively incorporating said universal identifiers into application program instructions executed by said rim processors;
    whereby the execution by a rim processor of an instruction having one of said unique universal identifiers will cause said rim processor to transmit to said hub processors the rim processor's unique identity and a requested data file unique identity, and each of said hub processors will examine its gentry file and its repertory file to determine whether the executing rim processor is permitted to access the requested data file, and said hub processor will transfer the requested data file to the executing rim processor if it determines the transfer is permitted.

* * * * *